United States Patent
Italiano et al.

(10) Patent No.: US 12,461,726 B2
(45) Date of Patent: Nov. 4, 2025

(54) MERGEABLE LIBRARIES

(71) Applicant: Apple Inc., Cupertino, CA (US)

(72) Inventors: Davide Italiano, San Francisco, CA (US); Damian Malarczyk, Hasselt (BE); Frederic Riss, Palo Alto, CA (US); Michael H. Rawdon, Mountain View, CA (US); Mohamadou A. Abdoulaye, San Francisco, CA (US); Nick Kledzik, Cupertino, CA (US); Peter Cooper, San Jose, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 18/205,369

(22) Filed: Jun. 2, 2023

(65) Prior Publication Data

US 2024/0403014 A1    Dec. 5, 2024

(51) Int. Cl.
*G06F 8/54* (2018.01)
*G06F 8/41* (2018.01)

(52) U.S. Cl.
CPC .............. *G06F 8/54* (2013.01); *G06F 8/425* (2013.01); *G06F 8/427* (2013.01)

(58) Field of Classification Search
CPC .................................. G06F 8/54; G06F 8/427
See application file for complete search history.

(56) References Cited

U.S. PATENT DOCUMENTS

| | | | | |
|---|---|---|---|---|
| 7,275,237 | B1 * | 9/2007 | Schneider | G06F 8/10 717/108 |
| 8,434,099 | B2 * | 4/2013 | Forin | G06Q 40/00 719/331 |
| 8,789,046 | B2 * | 7/2014 | Franke | G06F 9/45537 718/1 |
| 9,110,737 | B1 * | 8/2015 | Tibble | G06F 9/44521 |
| 9,298,451 | B2 * | 3/2016 | Kaneko | G06F 8/71 |
| 11,340,915 | B2 * | 5/2022 | Crane | G06F 21/54 |
| 2017/0003940 | A1 * | 1/2017 | Mital | G06F 8/40 |
| 2017/0147309 | A1 * | 5/2017 | Liberant | G06F 8/54 |
| 2017/0199732 | A1 * | 7/2017 | Tibble | G06F 8/70 |
| 2018/0046446 | A1 * | 2/2018 | Turovsky | G06F 9/455 |
| 2019/0079752 | A1 * | 3/2019 | Makkar | G06F 8/36 |
| 2024/0192936 | A1 * | 6/2024 | Trufas | G06F 8/4434 |

OTHER PUBLICATIONS

Ioannis Agadakos et al "Nibbler: Debloating Binary Shared Libraries"; ACSAC '19, Dec. 9-13, 2019, San Juan, PR, USA.*
[No Author Listed], "Xcode 2 User Guide," XP-002619555, Apple Computer, Inc., May 23, 2006, 226 pages.
Dietz et al., "Software Multiplexing: Share Your Libraries and Statically Link Them Too," Proceedings of the ACM on Programming Languages, Oct. 24, 2018, vol. 2, Issue OOPSLA, Article No. 154, 26 pages.
Wikipedia.org [online], "Library (computing)," Mar. 27, 2023, retrieved on May 23, 2023, retrieved from URL<https://en.wikipedia.org/w/index.php?title=Library_(computing)&oldid=11468 06945> 11 pages.

* cited by examiner

Primary Examiner — Francisco J Aponte
(74) Attorney, Agent, or Firm — Fish & Richardson P.C.

(57) ABSTRACT

Methods, systems, and apparatus, including computer programs encoded on computer storage media, for using mergeable libraries. One of the methods includes during a build of an executable target, generating the executable target by merging the executable target with data for a library that was previously linked with the executable target.

20 Claims, 6 Drawing Sheets

FIG. 2

| | |
|---|---|
| PROJECT | General  Signing & Capabilities  Resource Tags  Info  Building Settings  Build Phases  Build Rules |
| ▣ App A | 🔍 filter |
| TARGETS | > Target Dependencies (9 items) |
| ◯ App A | > Run Build Tool Plug-ins (0 items) |
| ◯ App A All | > Compile Sources(1 item) |
| ▣ Account | > Link Binary With Libraries (11 items)  _204_ |
| ▣ City | |
| ▣ Types | Name | Filters | Status |
| ▣ General | Account.framework | macOS | ⊟ ∨ Required ◇ |
| ▣ Navigation | Navigation.framework | Always Used | ⊟ ∨ Required ◇ |
| ▣ Orders | Store.framework | Always Used | ⊟ ∨ Required ◇ |
| ▣ Store | City.framework | Always Used | ⊟ ∨ Required ◇ |
| ▣ Truck | Orders.framework | Always Used | ⊟ ∨ Required ◇ |
| ▣ WidgetSupport | Truck.framework | Always Used | ⊟ ∨ Required ◇ |
| | General.framework | Always Used | ⊟ ∨ Required ◇ |
| _202_ | Types.framework | Always Used | ⊟ ∨ Required ◇ |
| | AppAKit | Always Used | ⊟ ∨ Required ◇ |
| | WidgetSupport.framework | Always Used | ⊟ ∨ Required ◇ |
| | libc++.tbd | Always Used | ⊟ ∨ Required ◇ |
| | + - Drag to reorder linked binaries |
| | > Copy Bundle Resources (2 items) |
| | > Embedded Foundation Extensions (0 items) |
| | > Embedded Frameworks (10 items) |
| + - 🔍 Filter | |

MERGEABLE LIBRARIES

BACKGROUND

Source code libraries can be linked statically or dynamically. Static linking is when the contents of a library, say a static library called x.a, are copied into the target binary. In dynamic linking, the linker does not copy the contents of a binary library, but instead just leaves references to the binary library in another file, e.g., a build of an executable target. These references for the dynamically linked library are resolved at runtime by a system, for example to find symbols in the system library folder. In this case, the target library must be on-disk for the system to use the target library during execution of the executable target.

SUMMARY

In general, one aspect of the subject matter described in this specification can be embodied in methods that include the actions of during a build of an executable target, generating the executable target by merging the executable target with data for a library that was previously linked with the executable target.

In general, one aspect of the subject matter described in this specification can be embodied in methods that include the actions of presenting, in an integrated development environment user interface and for a library, a user interface element that a user can select to indicate a linking type for the library from a plurality of linking types; receiving, from a device, input indicating selection, using the user interface element, of a particular linking type for the library from the plurality of linking types; and adding, to a source code file of the library, data indicating the particular linking type that will cause a linker to link the library with an executable target using the particular linking type.

In general, one aspect of the subject matter described in this specification can be embodied in methods that include the actions of receiving a request to execute an executable target that was built by merging the executable target with data for a library that was previously linked with the executable target; and in response to receiving the request, executing the executable target.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the method can include generating metadata for the library that represents a state of the library while linking the library with the executable target. Generating the executable target can include merging the executable target with data for the library uses the metadata that represents the state of the library. The method can include creating a compiled library by compiling the library. Linking the executable target with the library can link the compiled library with the executable target. Generating the metadata can include generating, using a result of parsing an object file for the library, a data structure that represents one or more symbols each of which are for a variable or a function call. Generating the metadata can include generating, using a result of parsing an object file for the library, a data structure that represents one or more atoms and one or more fixups for the library.

In some implementations, the method can include determining, for the executable target, the library on which the executable target depends; and determining whether the library is a mergeable library. Generating the executable target can include merging the executable target with data for the library that was previously linked with the executable target is responsive to determining that the library is a mergeable library. Determining whether the library is a mergeable library can use a mergeable library flag.

In some implementations, the method can include determining a build type for the build of the executable target; and determining, using the build type, to build the library as a mergeable library instead of as a dynamic library. Generating the executable target by merging the executable target with data for the library can be responsive to determining to build the library as a mergeable library instead of as a dynamic library. Determining to build the library as the mergeable library can include determining, using the build type, whether to store, in non-volatile memory, metadata that represents a state of the library. Generating the executable target by merging the executable target with data for the library can use the state of the library.

In some implementations, the build type can include one of a debug mode or a release mode.

In some implementations, adding the data indicating the particular linking type can change a setting for the library from an automatic mode in which the system determines a linking type for the library from the plurality of linking types to a manual mode that uses the particular linking type.

In some implementations, the method can include during a build of an executable target that references the library, linking the executable target and the library using the particular linking type. Linking the executable target and the library using the particular linking type can include appending metadata to an object file for the library. The particular linking type can be mergeable. The method can include, after linking the executable target and the library, generating the executable target by merging, using the metadata, the executable target with data from the object file for the library.

In some implementations, merging, using the metadata, the executable target with data from the object file for the library can include generating a symbol to library mapping that identifies one or more symbols used by one or more libraries each of which are merged or linked with the executable target.

In some implementations, the method can include determining that a build type for the executable target is a release build. Generating the executable target by merging the executable target with data for the library can be responsive to determining that the build type for the executable target is a release build.

In some implementations, the method can include determining that a build type for the executable target is a debug build; and in response to determining that the build type for the executable target is a debug build, determining to skip storing, during the linking and in non-volatile memory, metadata that represents a state of the library that would be stored in non-volatile memory if the build type was a release build. Linking the executable target and the library can include dynamically linking the executable target and the library.

In some implementations, the particular linking type can include one of dynamically linked, statically linked, or mergeable.

In some implementations, the executable target can be built by merging the executable target with data for the library using metadata that represented a state of the library.

In some implementations, executing the executable target can include accessing a symbol to library mapping a) that was generated using the metadata that represented the state of the library and b) that enables execution of the executable target with the same semantics as if the executable target were dynamically linked with the library.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can use different types of compilation for different uses of a compiled library to optimize compilation of the library for the intended build type. For instance, by having data indicating a build type, data indicating whether a library is mergeable, merging an executable target with data from a library that was previously linked with the executable target, or a combination of these, the systems and methods described in this specification can use different combination types for different build types. This can enable use of faster builds for use cases that require frequent builds, e.g., debug builds, slower builds of executable targets that will launch more quickly for build types that require more frequent launching, e.g., release builds, or a combination of both.

In some implementations, the systems and methods described in this specification can enable the option to either dynamically or statically link two files compared to other systems that require fixed dynamic or static linking, e.g., using data indicating a build type. In some implementations, the systems and methods described in this specification can reduce computer resource usage, e.g., by using metadata to merge an executable target with a previously linked library instead of recompiling and relinking the library. In some implementations, the systems and methods described in this specification can use the same semantics for different link types, e.g., dynamic and static linking. In some implementations, the systems and methods described in this specification can build an executable target with instructions that identify a location at which the executable target can find a dynamically linked library in memory to reduce a likelihood of differences in the execution between the executable file when dynamically linked or merged with the library.

In some implementations, the systems and methods described in this specification can enable delaying a determination whether to merge a binary with an executable target until building the executable target, e.g., in contrast to other systems that only allow dynamic or static linking with a received binary but not an option for either. For instance, a system can build a binary as mergeable and then determine to wait to determine whether to actually merge the binary with the executable target until building the executable target.

This can occur, for example, when a first entity, e.g., a third party vendor, builds and ships a binary as mergeable, e.g., in contrast to shipping a binary that is either dynamic or static but does not include the mergeable option for either. When a second entity, e.g., a developer, builds an executable target, a system for the second entity can determine during the build process whether one or more criteria are satisfied to merge the binary with the executable target, e.g., if one or more performance criteria are satisfied and the binary should be merged with the executable target. In some examples, the criteria might not be satisfied given disk space requirements. When the size of the executable target download does not satisfy the criteria, the system can determine to link to the binary dynamically and skip merging the binary with the executable target. This can occur in some examples when the executable target ships with the actual app, plus a number of app extensions like a plugin for another application. As a result, each of the executable targets can share a single copy of the binary that is included in the binary, e.g., better for disk space, potentially longer load times. In some examples, when the criteria are satisfied, the system can merge the vendor binary file into the actual app and the app extensions. This results in each of executable targets includes a copy of the merged code which is better for performance, e.g., potentially shorter load times, and uses more disk space.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2 and 3A-B depict example user interfaces of an integrated development environment.

Like reference numbers and designations in the various drawings indicate like elements.

DETAILED DESCRIPTION

Dynamically linked libraries enable faster build times than statically linked libraries. This can be beneficial for debugging code since a system can receive changes to code, e.g., from a developer device, build an executable target using the changes to the code, launch the executable target, and determine whether the bug still exists in the code. For instance, if the executable target crashes, the system can determine that the bug still exists in the code. As a result, dynamically linked libraries can save computational resources for debug builds of an executable target.

Statically linked libraries enable faster launching of an executable target, e.g., because a system that launches the executable target does not need to find a dynamically linked library on the system. As a result, statically linked files are beneficial for release builds of an executable target for which code will be less frequently changed than debug builds. A system can save computational resources by using statically linked libraries for release builds of an executable target since an executing device won't have to find and separately load corresponding dynamically linked libraries.

To provide the advantages of both dynamically linked libraries and statically linked libraries, consistent semantics between linking dynamically and statically, or both, a system can use metadata to indicate whether a library is "mergeable". In this specification, a library is mergeable when it can be linked dynamically for some executable target builds, and statically for other executable target builds of the same target. This can occur without recompiling, relinking, or both, the library. In some examples, whether the library is linked dynamically or statically, the resulting executable target will have the same semantics, e.g., resolve symbols in the same way. In some examples, instead of "statically" linking a library, the library would be merged with the executable target using the same code that could be used to dynamically link the library with the executable target.

The metadata can include one or more parameters. A parameter can indicate whether the library is a mergeable candidate. When a mergeable candidate is linked by a linker, the linker can create additional metadata that represents a state of the library by parsing the library. While in a debug mode, an executable target can link to the library in a dynamic mode. After creating the additional metadata, the linker can merge one or more mergeable libraries into an executable target for a release mode using the metadata without requiring another linking operation.

Figure 1:
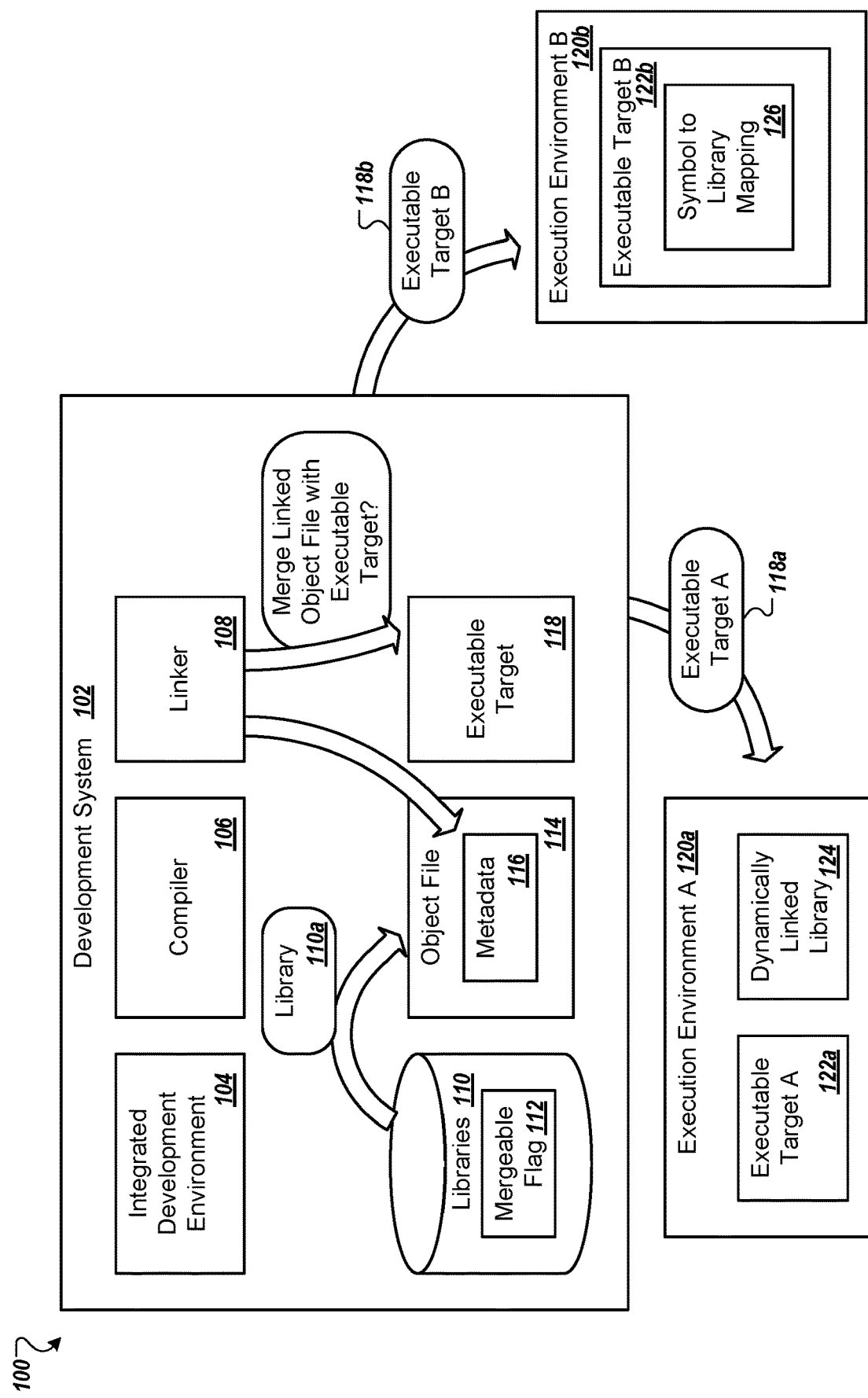
FIG. 1 depicts an example environment in which a development system uses a mergeable library flag.

FIG. 1 depicts an example environment 100 in which a development system 102 uses a mergeable library flag 112. The development system 102 includes an integrated development environment 104, which can be any appropriate development environment such as Xcode. The development system 102 uses the mergeable library flag 112 to determine whether a library 110 is mergeable and can be either dynamically or statically linked to an executable target, e.g., depending on a build type.

The development system 102 includes a compiler 106. The compiler 106 can retrieve a library 110a from a libraries database 110 as part of a compilation process. For instance, the compiler 106 can receive instructions to compile an executable target 118, determine the libraries 110 on which the executable target 118 depends, and retrieve the determined libraries from the libraries database 110, such the library 110a. The compiler 106 builds an object file 114 for the library 110a, e.g., a compiled library. The compiler 106 can build the executable target 118.

A linker 108, included in the development system 102, can determine how the object file 114 should be linked with the executable target 118. For instance, the linker 108 can determine whether the object file 114 should be dynamically or statically linked with the executable target 118. As part of a static linking process for a mergeable library, the linker 108 can merge data for the library with the executable target 118.

In some examples, as part of this determination, the linker 108 can determine whether the object file 114 is for a mergeable library. For instance, the linker 108 can determine whether the object file 114 should be dynamically linked, statically linked, or additional analysis is necessary since the object file 114 was created for a library 110a that has a mergeable library flag 112.

When the linker 108 determines that the object file 114 is not for a library 110a that has a mergeable library flag 112, the linker 108 can either dynamically or statically link the library with the executable target 118. For dynamic linking, the linker 108 can add references for the object file 114 into the executable target 118, e.g., instead of copying contents of the object file 114 binary into the executable target 118. For static linking, the linker 108 can copy contents of the object file 114 into the executable target 118.

When the linker 108 determines that the object file 114 is for a library 110 that has a mergeable library flag 112, the linker 108 can determine a build type for the executable target 118. The linker 108 can receive a parameter that identifies the build type with the request to link the executable target 118 with libraries upon which the executable target 118 depends. For instance, when the integrated development environment 104 receives a request, e.g., a button selection, to build the executable target 118, the integrated development environment 104 can provide the parameter that identifies the build type to the linker 108. In some examples, when the compiler 106, the linker 108, or both, are initiated using a command line interface, the linker 108 can receive a command line instruction that includes the parameter as a command line parameter.

In some examples, the build types can include a debug build or a release build. Other examples are possible.

When the linker 108 determines that the build type is for a debug build, the linker 108 can embed target dependency products from the object file 114 in the executable target 118, e.g., using a dynamic linking process. The embedded target dependency products can be links to symbols in the object file 114. The linker 108 can link other libraries 110 with the executable target 118 as appropriate for each of the libraries 110. For instance, the linker 108 can link some of the libraries 110 statically with the executable target 118, others of the libraries 110 dynamically with the executable target 118, and different libraries 110 using the mergeable library flag 112 process.

The development system 102 can then provide the executable target A 118a for execution in an execution environment A 120a. As noted above, the execution environment A 120a can be a debug environment. In some implementations, the integrated development environment 104 can provide the debug environment. For instance, the development system 102 can provide a reference to the executable target A 118a to a debug mode in the integrated development environment 104. The integrated development environment 104 can launch the executable target 118 in the debug mode to enable testing of the executable target.

The execution environment A 120a includes the executable target A 122a and, separately, a dynamically linked library 124. The dynamically linked library 124 is a dynamically linked version of the mergeable library 110a that has the mergeable library flag 112. As noted above, the execution environment A 120a can include other libraries that can be statically linked to the executable target A 122a, dynamically linked to the executable target A 122a, or a combination of both.

In some implementations, to reduce a likelihood of differences in the execution between dynamic linking and merging the object file 114 with the executable target 118, the development system 102 can build the executable target

118 with instructions that identify a location at which the executable target 118 can find the dynamically linked library 124, e.g., the corresponding object file 114, in memory. The location can be a relative location, e.g., to the location at which the executable target 118 is installed, from which the executable target 118 is executed, or both. In some examples, the location can identify a system folder.

The development system 102 can store the dynamically linked library 124, e.g., the corresponding object file 114, at the location. In some examples, the location is a different location than another location at which non-mergeable dynamically linked libraries are stored. For instance, there can be a possibility of runtime issues between different build types of an executable target because the file layout, e.g., schema, of the different builds is different. For a first build type that uses a dynamically linked version of the object file 114, instead of including all code merged into the executable target 118, the executable target 118 can include code that uses file system calls to find the dynamically linked library 124. When switching to a second, different build type, execution of the executable target 118 might have runtime problems because the object file 114 is not at the location used for the first build type. To reduce a likelihood of these runtime problems, the development system 102 can store the dynamically linked library 124 to a different location in memory, e.g., compared to a default location for dynamically linked libraries, and provide a dynamic linker with a message indicating that the dynamically linked library 124 is at the different location, e.g., "it is really over there". As a result, from the perspective of the running executable target A 120, the dynamically linked library 124 is never a file on disk at the default, e.g., normal, dynamically linked library location.

When the linker 108 determines that the build type is for a release build, the linker 108 can merge the object file 114 into the executable target 118, e.g., similar to a static linking process. The linker 108 can embed the object file 114 in either a binary product for the executable target 118 or into a product, such as an app, that contains the binary product for the executable target. The linker 108 can link other libraries 110 with the executable target 118 as appropriate for each of the libraries 110. For instance, the linker 108 can link some of the libraries 110 statically with the executable target 118, others of the libraries 110 dynamically with the executable target 118, and different libraries 110 using the mergeable library flag 112 process.

During merging of the object file 114 into the executable target 118, the linker 108 can create a symbol to library mapping 126 for the symbols in the object file 114. When the executable target 118 is launched, the executable target 118 can use the symbol to library mapping 126 to resolve symbols in the statically linked object file 114.

For example, the development system 102 can provide the executable target 118, as the executable target B 118*b* that is a release build, to a downstream device. The downstream device to which the executable target B 118*b* is provided can be a storage for release builds, e.g., part of an application store, a device that will launch the executable target B 118*b*, e.g., a client or user device, or a combination of the two. The client or user device can provide an execution environment B 120*b*, e.g., a release execution environment.

When launched, the executable target B 122*b* can resolve symbols in the object file 114 that are embedded in the executable target 118 using the symbol to library mapping 126. For instance, the symbol to library mapping 126 can include entries that map various symbols in the executable target B 122*b* to various libraries that are linked, statically or dynamically, to the executable target B 122*b*. The symbol to library mapping 126 can enable the executable target B 112*b* to determine, when multiple libraries have the same symbol, which library's version of the symbol to use when the symbol occurs in the code of the executable target B 122*b*. By using the symbol to library mapping 126, the executable target B 122*b* can have the same semantics, e.g., resolve symbols in the same way, as the executable target A 122*a* for which the object file 114 was linked in a different way. As a result, irrespective of the build type of the executable target 118, the executable target 118 can execute in the same way instead of having different semantics for libraries linked in different ways, e.g., dynamically linked and statically linked libraries.

In some implementations, the linker 108 can generate metadata 116 for a library 110 with a mergeable library flag 112. The linker 108 can use the metadata 116 to merge data for the object file 114 with the executable target 118. The metadata 116 can include the symbol to library mapping 126.

For example, during a release build of the executable target 118, the linker 108 can parse the object file 114 and generate the metadata 116 using a result of the parsing. The metadata 116 can represent the linker's 108 internal state after parsing the object file 114. This parsing process can be similar to the parsing performed, e.g., by the linker 108, to dynamically link the object file 114 with the executable target 118. As a result, the symbol to library mapping 126 can include a mapping to resolve symbols as if the object file 114 were dynamically linked to the executable target 118.

The linker 108 links the object file 114 with the executable target 118. The linking can take place while generating the metadata 116, after generating the metadata 116, or a combination of both.

The linker 108 merges the object file 114 with the executable target 118 using the metadata 116. For example, the linker 108 merges the object file 114 that includes the metadata 116, or merges at least a portion of the metadata 116, e.g., without other data from the object file 114, into the executable target 118.

In some examples, the linker 108 can serialize the metadata 116 into the library, e.g., into the object file 114. The linker 108 can add a new load command for loading the object file 114 into the executable target 118. The new load command can indicate, for example, that "this file contains metadata." In some examples, the linker 108 can add, to the object file 114, a pointer that identifies the location of the metadata 116 in the object file 114. The linker 108 and other components in the development system 102 can use the pointer to access the metadata 116. By merging the object file 114 with the metadata 116 into the executable target 118, the linker 108 adds the symbol to library mapping 126 to the executable target 118.

In some implementations, the linker 108 determines whether to skip storing the metadata 116 in non-volatile memory for some builds of the executable target 118, e.g., depending on the build type, a number of libraries on which the executable target 118 depends, one or more other metadata storage criteria, or a combination of these. For instance, the linker 108 can determine to skip storing the metadata 116 for a debug build of the executable target 118. This can save computational resources for build types in which the linker 108 would not use the metadata 116. Although the metadata 116 can represent an internal state of the linker 108 when parsing the object file 114, the linker 108 can still have this internal state without storing the metadata 116 in the non-volatile memory, e.g., without creating a data structure stored separately in memory other than the internal state of the linker 108.

The linker 108 can determine to store the metadata 116 in non-volatile memory for a build that depends on a number of libraries that satisfies a library threshold. For instance, to reduce a build time for debug builds that depend on a larger number of libraries that satisfies the library threshold, the linker 108 can store the metadata 116, e.g., as part of the object file 114, for at least some of the libraries on which the executable target 118 depends. The linker 108 can store the metadata in non-volatile memory for all of the libraries. In some examples, the linker 108 can store the metadata in non-volatile memory for one or more libraries that do not satisfy an update frequency threshold, e.g., that are less likely to be updated than other libraries on which the executable target 118 depends. This can reduce computational resource usage, time, or both, for linking libraries to the executable target 118, e.g., by the linker not having to convert the library 110 to the object file 114 each time the library 110 is linked to the executable target 118.

In some implementations, the linker 108 can generate the metadata 116 using any appropriate process. For instance, the linker 108 can generate the metadata 116 using one or more of parsing an object file, one or more optimization passes of the object file, e.g., optimizing function call stubs, or both.

The linker 108 can use, to generate the metadata 116, one or more different types of data structures. The data structures can include atoms, fixups, or both. An atom can be the most fine grained unit of data on which the linker 108 operates. The linker 108 can convert a single object file 114 into multiple atoms. For example, the linker 108 can generate one atom for each function, each global data value, each undefined symbol, or a combination of these, defined in the library 110*a* and the corresponding object file 114. Given the code included in Table 1, below, some examples of values for which atoms are generated can include a global data value "a," a global data value "b," a function "x," the undefined symbol "printf," and the string passed to printf, e.g., as input represented by "const char*".

TABLE 1

Sample Library Code

```
extern int printf(const char*, . . .);
int a, b;
void x( ) {
    printf("a: %d, b: %d\n", a, b);
}
```

An atom can include multiple fixups. Fixups can be defined at an assembly code level for the corresponding library code. A fixup can be a pointer to an absolute address in the object code that changes when a loader relocates the program so that it will refer to the correct location. Given the assembly code included in Table 2, below, some examples of values for which fixups are generated can include the address ("adrp/ldr") to load value of "a," the adrp/ldr to load value of "b," the branch with link ("bl") to the address of "printf," and the adrp/ldr to load the string passed to printf, e.g., as input.

TABLE 2

Sample Assembly Code

```
_x:
    adrp x8, _a@GOTPAGE
    ldr x8, [x8, _a@GOTPAGEOFF]
    adrp x9, _b@GOTPAGE
    ldr x9, [x9, _b@GOTPAGEOFF]
    ...
    adrp x0, 1_.str@PAGE
    add x0, x0, 1_.str@PAGEOFF
    bl _printf
    ret
```

The linker 108 can generate a single set of metadata 116, e.g., a single file, for each object file 114. The metadata 116 can include all or at least a subset of the atoms and fixups for the corresponding object file 114. In some implementations, the metadata 116 can include data other than data for atoms, fixups, or both. For instance, the metadata 116 can include data that identifies the architecture, the platform, or both, for the object file 114.

In some implementations, the linker 108 can serialize the metadata 116 with offsets, indices, or a combination of both, for the data structures included in the metadata 116. For example, the linker 108 can generate a serialized atom with an array of fixup for that atom. These fixups can be encoded as a start index and count. This can reduce computational resources required to access the atom, the fixup, or both, e.g., compared to using pointers or scanning serialized data.

In some implementations, the linker 108 or another component in the development system 102, e.g., the integrated development environment 104, can store at least some of the metadata 116 for the object file 114 in memory, e.g., a non-volatile memory. By storing the metadata 116 in memory, the linker 108 can access the metadata 116 during subsequent links of the object file 114 to an executable target, the linker 108 can use the stored metadata 116 to link the library 110*a* to the executable target. In some examples, when an executable target is linked with multiple different libraries, this can enable the linker 108 to only parse those libraries that changed since the most recent prior linking and use the stored metadata 116 for the other libraries that have not changed when linking the libraries upon which the executable target depends.

The linker 108 can determine whether metadata 116 for the library 110*a* is stored in memory. If not, the linker 108 can determine to parse an object file for the library 110*a*. If the metadata 116 is stored in memory, the linker 108 can determine to skip parsing the object file 114 for the library 110*a* and instead use the stored metadata 116 to link the library 110*a* with the executable target 118. The stored metadata 116 could have been generated for a prior linking process with the executable target 118 or with a different executable target.

In some implementations, the symbol to library mapping 126, the metadata 116, or both, can enable a two-level namespace for symbol resolution. In a flat namespace, a call to a symbol, e.g., printf or the variable "b", would result in a symbol table entry for that symbol. At runtime, the loader would look in all loaded binaries' symbol tables for the symbol and use the first instance of that symbol that the loader finds. As a result, the order in which the loader looks at the loaded binaries can affect how the variable is resolved.

In a two-level namespace, the linker finds the symbol, e.g., printf or the variable "b", at link time, and records the library containing the symbol. In the linked binary, the reference to the symbol, e.g., printf, would indicate the library from which it came, e.g., libSystem.library. At runtime, even if another library exports the same symbol, e.g., printf, the loader will ignore the other library's version of the symbol and only look in libSystem.library using the record of the library containing the symbol.

In some instances, statically linked files use a flat namespace while dynamically linked libraries use a two-level namespace. As a result, statically linked libraries and dynamically linked libraries have different semantics and corresponding executable targets that depend on a single library might function differently depending on whether the library was statically or dynamically linked to the executable target.

To enable an executable target to function the same way whether a library is statically or dynamically linked, the linker 108 generates the metadata 116 that includes the symbol to library mapping 126. The linker 108 includes the symbol to library mapping 126 in the executable target B 112b. As a result, the executable target B 112b has the same semantics as if the library 110a were dynamically linked, e.g., as the executable target A 122a with the dynamically linked library 124 version of the library 110a.

The development system 102 is an example of a system implemented as computer programs on one or more computers in one or more locations, in which the systems, components, and techniques described in this specification are implemented. The client and user devices can include personal computers, mobile communication devices, and other devices that can send and receive data over a network. The network (not shown), such as a local area network ("LAN"), wide area network ("WAN"), the Internet, or a combination thereof, connects the user devices, an application store, and the development system 102. The development system can use a single computer or multiple computers operating in conjunction with one another, including, for example, a set of remote computers deployed as a cloud computing service.

The development system 102 can include several different functional components, including the integrated development environment 104, the compiler 106, and the linker 108. In some examples, the compiler 106, the linker 108, or both, can be part of the integrated development environment 104. The integrated development environment 104, the compiler 106, the linker 108, or a combination of these, can include one or more data processing apparatuses, can be implemented in code, or a combination of both. For instance, each of the integrated development environment 104, the compiler 106, and the linker 108 can include one or more data processors and instructions that cause the one or more data processors to perform the operations discussed herein.

Figures 3A, 3B:
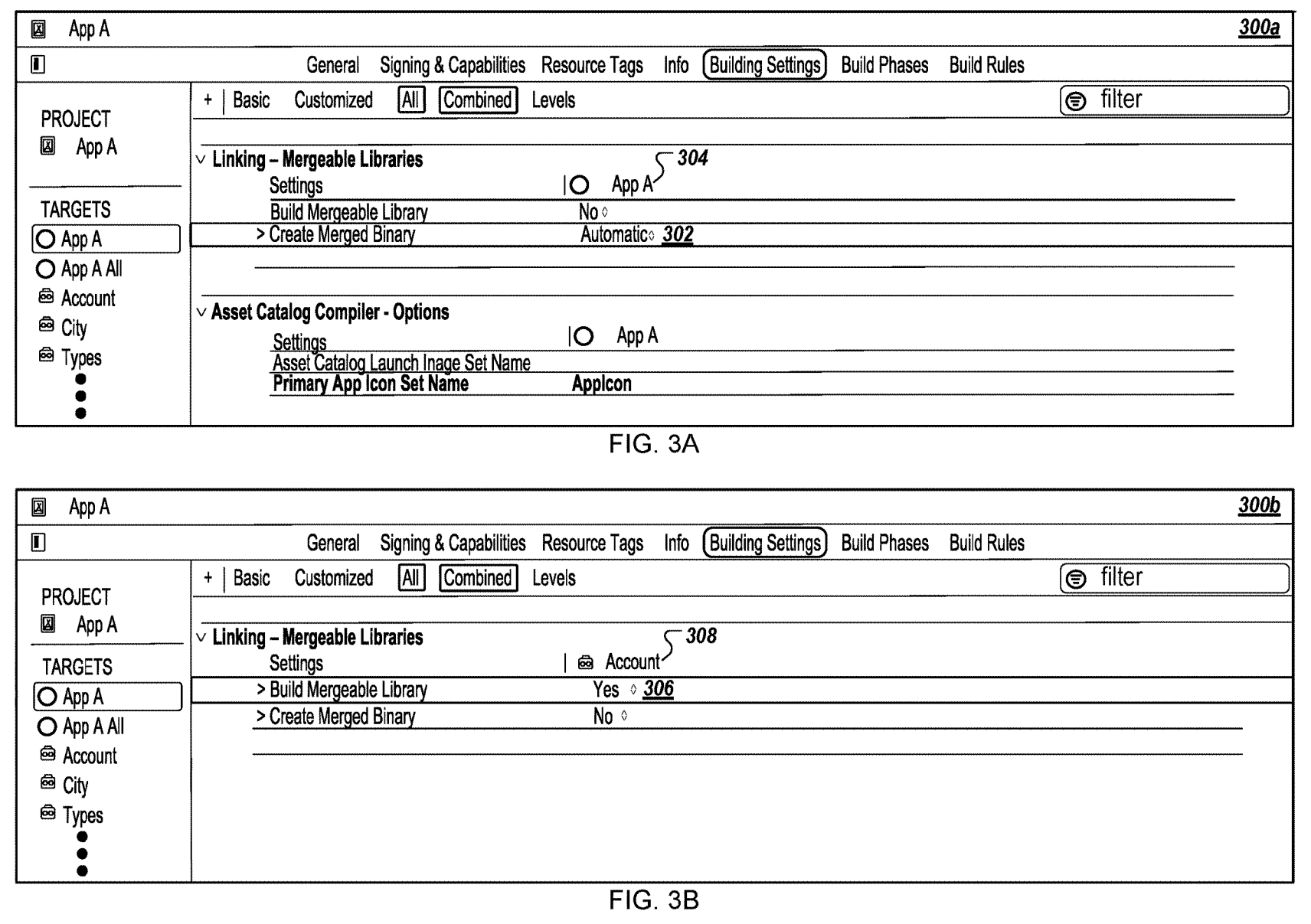

FIGS. 2 and 3A-B depict example user interfaces 200, 300a-b of an integrated development environment. The integrated development environment 104 of FIG. 1 can generate the user interfaces 200, 300a-b to enable presentation of one or more options for mergeable libraries.

As depicted in FIG. 2, the user interface 200 presents information for an executable target "App A" that depends on multiple libraries. In this example, the multiple libraries include "Account," "Navigation," "Store," "City," "Orders," "Truck," "General," "Types," and "WidgeSupport."

The user interface 200 includes a first portion 202 that identifies the libraries that are included in the code for the executable target of App A. As a result of this inclusion, these libraries are directly linked to the executable target of App A. These libraries can be referred to as "immediate dependencies" of App A. These libraries can include static libraries, dynamic libraries, mergeable libraries, or a combination of these.

A second portion 204 of the user interface 200, e.g., a "Link Binary with Libraries" portion, lists the libraries that are directly linked to the executable target of App A. The second portion 204 can reference the libraries using frameworks for developer written libraries, such as an "Account.framework" for an Account library. The frameworks can be special bundles that wrap the corresponding library's required files and metadata, e.g., the object file 114, the metadata 116, or both. The object file 114 can be dynamically or statically linked to the executable target for App A. For instance, a first object file for a first framework can be dynamically linked while a second object file for a second framework can be statically linked to the executable target for App A. In some examples, the wrapper can include references to corresponding data, e.g., object files, metadata, or both. The references can be system links. The second portion 204 can identify one or more system libraries, such as libc++.tbd.

When the developer written libraries are identified as "mergeable," the integrated development environment can add additional data to the libraries or data associated with the libraries. For instance, the integrated development environment can add a "-make_mergeable" linker flag to any libraries identified as mergeable. When a linker links a library with the "-make_mergeable" linker flag to an executable target, the linker can merge data for the library, e.g., data from the corresponding object code, with the target executable for App A. In some implementations, the linker can determine, using the "-make_mergeable" linker flag to generate, store, or both, metadata for the corresponding library, e.g., as discussed above.

Linker invocation of a link to the executable target for App A can use a "-merge_framework" flag instead of a "-framework" flag used for non-mergeable libraries, whether the libraries are dynamically or statically linked. The linker can determine to use this "-merge_framework" flag upon detecting the "-make_mergeable" linker flag for a library.

The integrated development environment can identify libraries as mergeable automatically or in response to input, e.g., received using the user interface of the integrated development environment. For instance, the integrated development environment can execute on a developer device and receive input indicating selection of a user interface element that indicates that a library should be mergeable or the integrated development environment should automatically determine whether to make libraries mergeable.

FIG. 3A depicts an example of a user interface 300a in which a "create merged binary" user interface element 302 is set to "automatic." The "create merged binary" user interface element 302 is specific to an executable target App A 304. As a result, a different setting for this user interface element for a different executable target App B, would not have any effect on the setting for the executable target App A 304.

The "create merged binary" user interface element 302 can have, in this example, three options: no, automatic, or manual. When set to "no," the integrated development environment does not use mergeable library settings for the executable target App A 304, irrespective of different settings for the linked libraries, as described in more detail below. When set to "manual", as discussed in more detail below, only those libraries that are set as "build mergeable library" are merged into the executable target A 304.

When set to "automatic," the integrated development environment can automatically determine how to link the libraries with the executable target App A 304. The integrated development environment can make this determination using a build type for the executable target App A 304. For instance, the integrated development environment can dynamically link immediate dependencies of the App A 304 during a debug build. The integrated development environment can merge immediate dependencies of App A 304 during a release build.

FIG. 3B depicts an example of a user interface 300b in which a "build mergeable library" user interface element 306 is set to "yes." The "build mergeable library" user interface element 306 is specific to an Account library. The library can be used by multiple executable targets, such as the executable target App A and an app extension called Widgets.

The "build mergeable library" user interface element 306 can have, in this example, two options: yes, or no. When set to "yes," the integrated development environment can create a "-make_mergeable" linker flag for the corresponding Account library. When the "create merged binary" user interface element 302 for an executable target is set to "manual," the integrated development environment uses the options for the "build mergeable library" user interface element to determine whether to build a mergeable library. If the "create merged binary" user interface element 302 is set to no or automatic, the integrated development environment can ignore this setting, e.g., and proceed as if this setting did not exist for either the no or automatic option.

When the "build mergeable library" user interface element 306 is set to "no" and the "create merged binary" user interface element is set to "manual," the integrated development environment determines to link the Account library using another process, e.g., a default setting that indicates whether static or dynamic linking should be used. In some examples, the default setting indicates that dynamic linking should be used.

When the "build mergeable library" user interface element 306 is set to "yes" and the "create merged binary" user interface element is set to "manual," the integrated development environment can determine how to link the Account library with the executable target App A using a build type for the executable target App A. For instance, the integrated development environment can dynamically link the Account library to the executable target App A 304 during a debug build. The integrated development environment can merge the Account Library with the executable target App A 304 during a release build.

In some implementations, the integrated development environment can include a user interface that enables select, creation, or both, of different build types. The user interface can include a user interface element that enables input to indicate how a library should be linked to a corresponding executable target given the build type. For instance, the user interface can enable changes to settings for release builds, debug builds, or both. In some examples, the user interface can enable receipt of input indicating rules for when libraries should be linked dynamically or merged with a corresponding executable target.

In some implementations, the integrated development environment can enable flagging a pre-built, e.g., system, library as mergeable. For instance, the integrated development environment can include a user interface element, e.g., as part of a manual option, that enables adding "-merge_framework" or "-merge_library" for a pre-built library.

In some implementations, the integrated development environment can select a number, type, or both, of dependencies of an executable target that can be merged with the executable target. For instance, the integrated development environment can determine to merge at most immediate dependencies or immediate dependencies and their children into the executable target.

In some implementations, the user interfaces 300a-b can define settings used by more than one executable target. For instance, given the above example in which the Account library is used by both the executable target App A and the app extension Widgets, the integrated development environment can use any mergeable library settings for the Account library for both executable targets. If the Account library is set to build mergeable library as yes or no, and both executable targets are set to manual, the integrated development environment can use that setting to determine how to link the Account library to each of the executable targets separately. If one of the executable targets, e.g., the app extension Widgets, is set to no or automatic for create merged binary while the executable target App A is set to manual, then the integrated development environment can determine different processes by which the Account library should be linked to each of the executable targets.

Figure 4A:
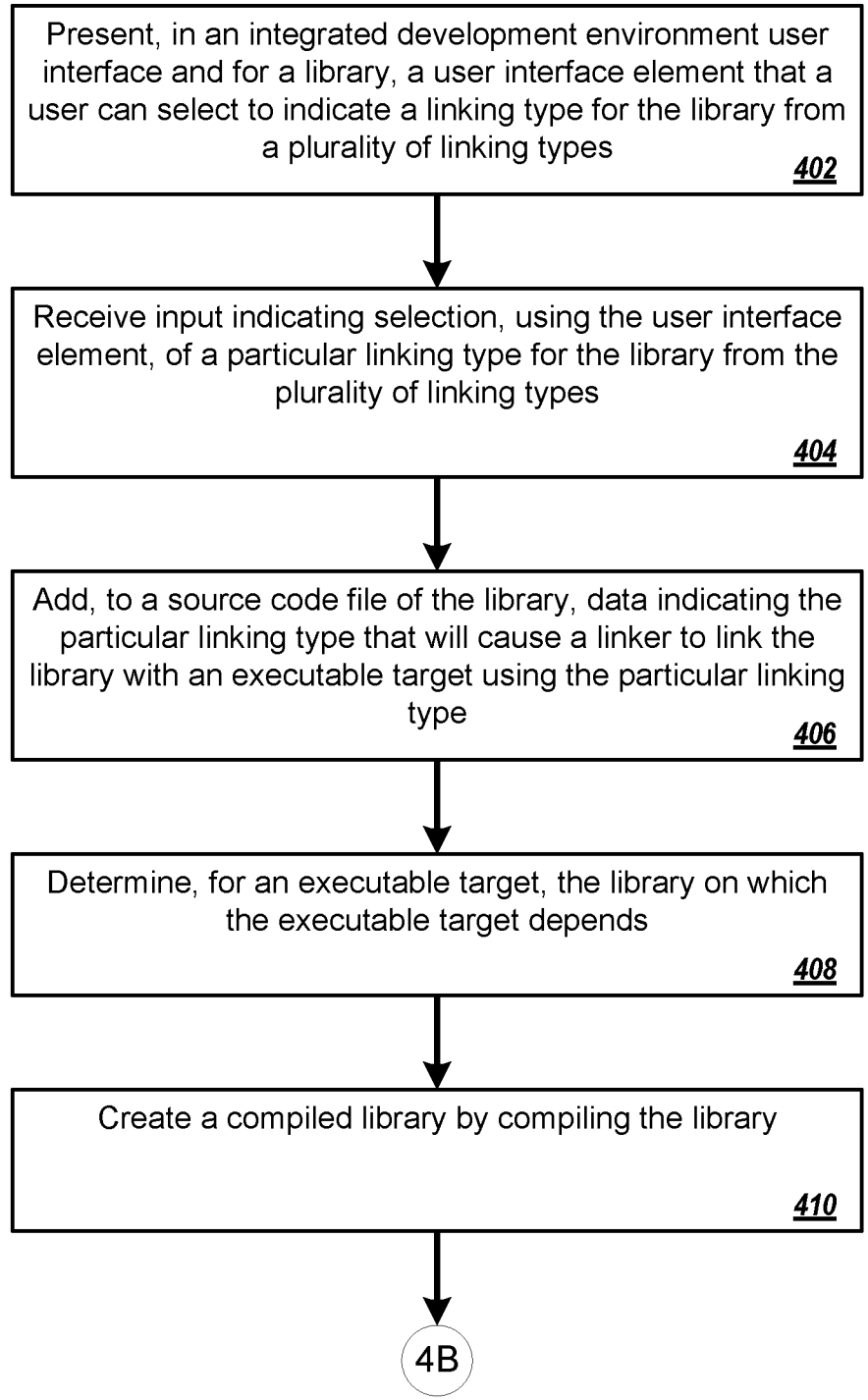
FIGS. 4A-B are a flow diagram of an example process for using mergeable libraries.
Figure 4B:
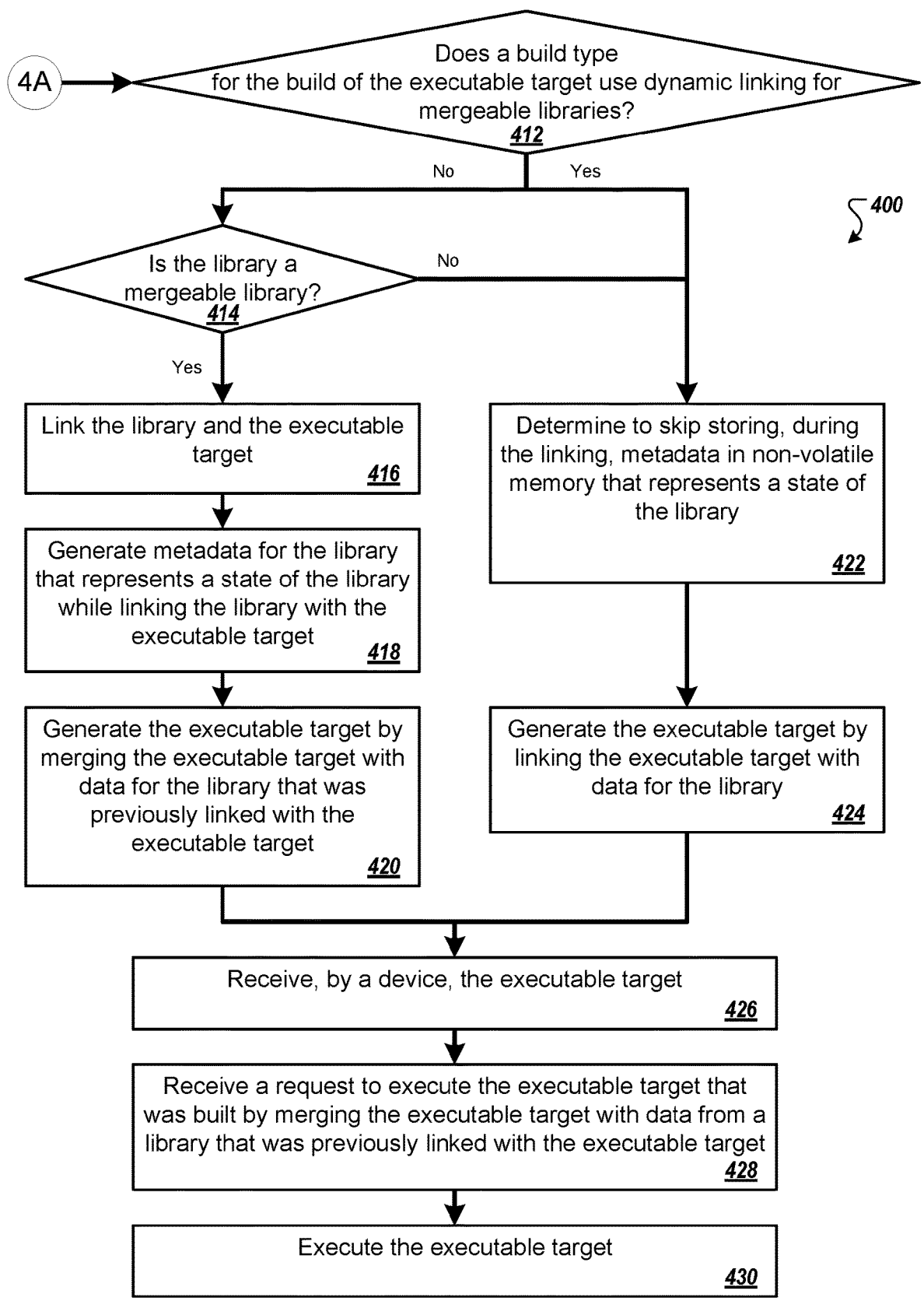

FIGS. 4A-B are a flow diagram of an example process 400 for using mergeable libraries. For example, the process 400 can be used by the development system 102, and the device from the environment 100.

The development system presents, in an integrated development environment user interface and for a library, a user interface element that a user can select to indicate a linking type for the library from a plurality of linking types (402). In some examples, the development system can present a second user interface element that a user can select to indicate a build type for an executable target.

The development system can execute on a device, e.g., be implemented on the device, and present the user interface element on a display connected to the device. For example, the device can be a desktop or laptop computer and the display can be a display device integrated into the computer or external from the computer.

The development system receives input indicating selection, using the user interface element, of a particular linking type for the library from the plurality of linking types (404). The plurality of linking types can include mergeable or not mergeable. The user interface element can present options for "yes" or "no" indicating whether the library is mergeable.

The development system adds, to a source code file of the library, data indicating the particular linking type that will cause a linker to link the library with an executable target using the particular linking type (406). For instance, in response to receipt of an indication that the library should be mergeable, the development system can add the data to the source code file. The data can be a flag or other appropriate data.

In response to determining that the user interface element indicates that the library should not be mergeable, the development system can determine to skip adding data indicating the particular linking type to the source code file. For instance, the development system can determine that since the library should not be mergeable, the development system will skip adding a mergeable flag to the source code file.

The development system determines, for an executable target, the library on which the executable target depends (408). For example, the development system can receive, using a user interface, selection of an option to build the executable target. In response, the development system can determine multiple libraries, e.g., one or more, on which the executable target depends. The multiple libraries can include the library for which the development system adding the data indicating the particular linking type, e.g., as mergeable.

The development system creates a compiled library by compiling the library (410). For instance, the development system uses a compiler, e.g., included in an integrated development environment, to compile the library.

The development system determines whether a build type for the build of the executable target uses dynamic linking for mergeable libraries (412). For instance, the development system can determine whether the build type is a debug build or a release build.

The development system determines whether the library is a mergeable library (414). For example, in response to determining that the build type for the build of the executable target does not use dynamic linking for mergeable libraries, the development system determines whether the library is a mergeable library. The development system can determine that since the executable target is for a release build, the development system should analyze the library dependencies for the executable target to determine whether to dynamically link or merge object code for those libraries with the executable target.

The development system links the library and the executable target (416). For example, in response to determining that the library is a mergeable library, the development system can parse data for the library, e.g., parse an object file generated during compilation of the library.

The development system generates metadata for the library that represents a state of the library while linking the library with the executable target (418). The generation of the metadata can occur substantially concurrently with linking the library to the executable target. The development system can store the generated metadata in a non-volatile memory.

The development system generates the executable target by merging the executable target with data for the library that was previously linked with the executable target (420). For instance, the development system can merge at least a portion of the metadata with the executable target. In some examples, the development system can merge the metadata with the executable target.

The development system determines to skip storing, during the linking, metadata in non-volatile memory that represents a state of the library (422). This can occur in response to determining that the build type uses dynamic linking for mergeable libraries, or that the library is not a mergeable library. In some examples, the development system can determine whether to store the metadata in non-volatile memory, e.g., using one or more storage criteria. In these examples, the development system can perform step 422 after determining whether to store the metadata in non-volatile memory. In some implementations, as described in more detail above, the development system can determine to store the metadata, e.g., for a debug build, in non-volatile memory. In these implementations, the development system can perform the storage process instead of determining to skip the storage.

The development system generates the executable target by linking the executable target with data for the library (424). For example, the development system dynamically links an object file for the library with the executable target.

The development system can store the executable target in memory. The executable target can be dynamically linked with the library, include merged data for the library, or a combination of both for different libraries. The development system, or another system that accesses the stored copy of the executable target, can provide the executable target to a device.

The device receives the executable target (426). The device can be any appropriate type of device, such as a laptop, desktop, or smart device. The device can receive the executable target using a network, a cord, e.g., as part of a factory installation, or using another appropriate process.

The device receives a request to execute the executable target that was built by merging the executable target with data from a library that was previously linked with the executable target (428). For instance, the device can store, install, or both, the executable target in memory. If only stored, when receiving a request to execute the executable target that is only stored on the device, the device can first install the executable target.

The device can receive the request using any appropriate type of input. For instance, the device can receive the request using input from a keyboard, a mouse, a touch screen input, or a verbal command.

The device executes the executable target (430). For instance, the device executing the executable target and uses a symbol to library mapping included in metadata merged with the executable target to resolve one or more symbols for the executable target.

The order of operations in the process 400 described above is illustrative only, and using the mergeable libraries can be performed in different orders. For example, the process 400 can perform operation 414, e.g., determine whether a library is mergeable, and then perform operation 412, e.g., determine whether the build type uses dynamic linking for mergeable libraries.

In some implementations, the process 400 can include additional operations, fewer operations, or some of the operations can be divided into multiple operations. For example, the process 400 can include operations 402 to 406 without the other operations. The process 400 can include operations 408 to 420, or 412 to 420, without the other operations. The process 400 can include operations 408 to 412 and 422 to 424; operations 408 to 414 and 422 to 424; operations 412, 422, and 424; or operations 412, 414, 422, and 424, without the other operations. The process 400 can include operations 416 to 420, 418 and 420, or just 420 alone, without the other operations. In some examples, the process 400 can include operations 422 and 424 without the other operations. The process 400 can include operations 426 to 430, 428 and 430, or only 430, without the other operations.

In some implementations, determining the library on which the executable target depends can be responsive to receipt of a request to build the executable target. For instance, the development system can detect selection of an interface element that indicates that the development system should build the executable target.

In some implementations, determining the library on which the executable target depends can include determining multiple libraries on which the executable target depends. The development system can determine the direct dependencies that are libraries listed in target's included libraries, e.g., listed in the "Link Binary with Libraries" user interface portion. In some examples, the development system can determine one or more indirect dependencies that can be libraries that a direct dependency includes that are not a direct dependency of the target. In some examples, the development system can determine a combination of both direct and indirect dependencies.

The development system can perform one or more steps of the process 400 for each of the direct dependencies, each of the indirect dependencies, or a combination of the two. For instance, the development system can perform steps 410 and either 416 to 420 or 422 and 424 for each of the direct dependencies and optionally some indirect dependencies. In some examples, the development system can perform steps 410 and 424 for system libraries that are not mergeable but are direct dependencies of the target. The development system can perform steps 410 and 424 for one or more indirect dependencies.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A number of implementations have been described. Nevertheless, it will be understood that various modifications may be made without departing from the spirit and scope of the disclosure. For example, various forms of the flows shown above may be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
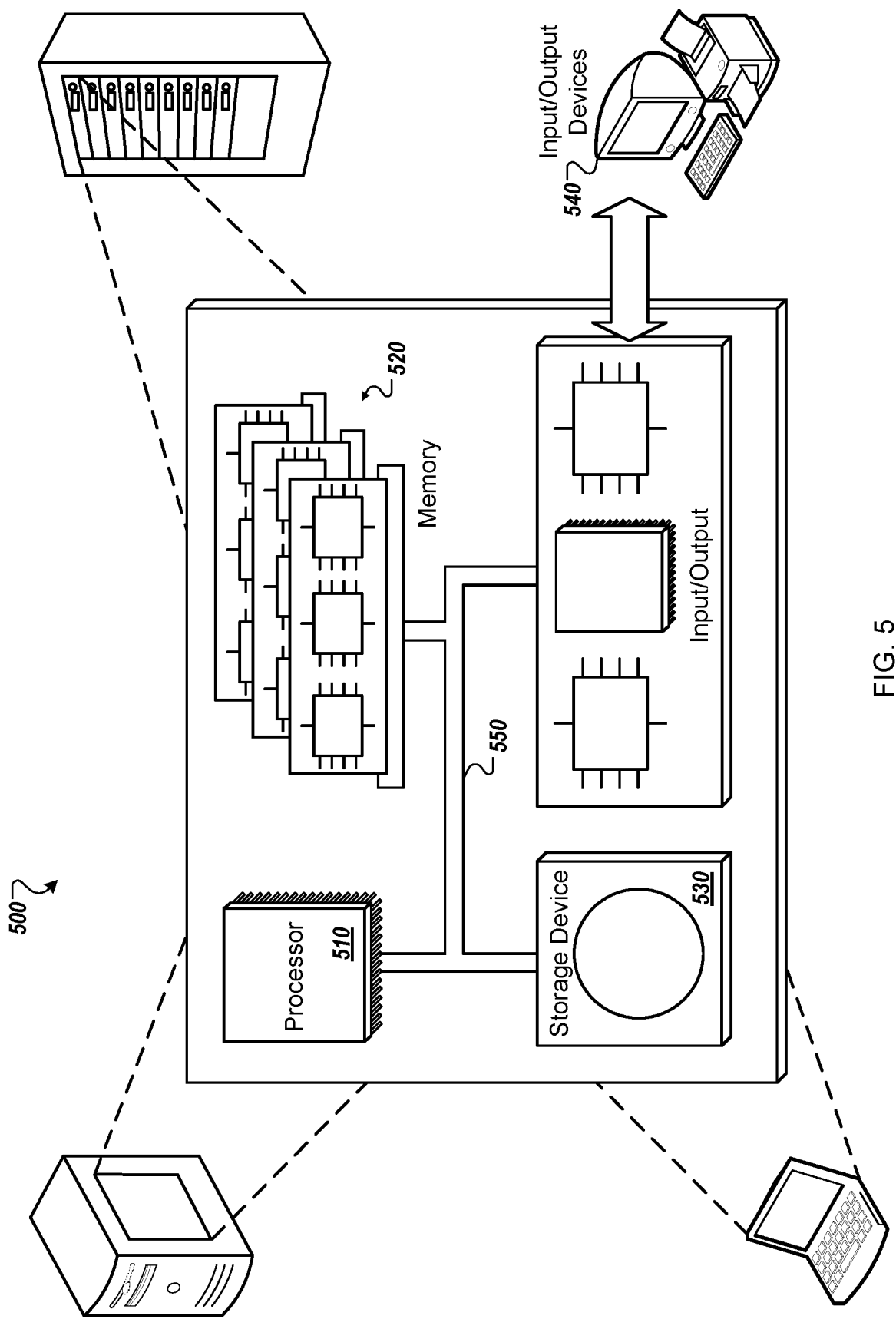
FIG. 5 is a block diagram of a computing system that can be used in connection with computer-implemented methods described in this specification.

An example of one such type of computer is shown in FIG. 5, which shows a schematic diagram of a computer system 500. The system 500 can be used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A computer-implemented method for merging an executable target with a library, the method comprising:
   during a build of the executable target:
      determining that the executable target was linked with the library using a first type of linking process; and
      in response to determining that the executable target was linked with the library using the first type of linking process, generating the executable target by merging, using a second, different type of linking process, a) the executable target with b) data for the library that was previously linked with the executable target using the first type of linking process.

2. The method of claim 1, comprising generating metadata for the library that represents a state of the library while linking the library with the executable target using the first type of linking process,
   wherein generating the executable target by merging, using the second, different type of linking process, a) the executable target with b) data for the library uses the metadata that represents the state of the library.

3. The method of claim 2, comprising creating a compiled library by compiling the library, wherein linking the executable target with the library links the compiled library with the executable target.

4. The method of claim 2, wherein generating the metadata comprises generating, using a result of parsing an object file for the library, a data structure that represents one or more symbols each of which are for a variable or a function call.

5. The method of claim 2, wherein generating the metadata comprises generating, using a result of parsing an object file for the library, a data structure that represents one or more atoms and one or more fixups for the library.

6. The method of claim 1, comprising:
determining, for the executable target, the library on which the executable target depends; and
determining whether the library is a mergeable library,
wherein generating the executable target by merging, using the second, different type of linking process, a) the executable target with b) data for the library that was previously linked with the executable target, using the first type of linking process, is responsive to determining that the library is a mergeable library.

7. The method of claim 1, comprising:
determining a build type for the build of the executable target; and
determining, using the build type, to build the library as a mergeable library instead of as a dynamic library,
wherein generating the executable target by merging, using the second, different type of linking process, a) the executable target with b) data for the library is responsive to determining to build the library as a mergeable library instead of as a dynamic library.

8. The method of claim 7, wherein:
determining to build the library as the mergeable library comprises determining, using the build type, whether to store, in non-volatile memory, metadata that represents a state of the library; and
generating the executable target by merging, using the second, different type of linking process, a) the executable target with b) data for the library uses the state of the library.

9. One or more non-transitory computer storage media for executing an executable target that was merged with a library and encoded with instructions that, when executed by one or more computers, cause the one or more computers to perform operations comprising:
receiving a request to execute the executable target that was built by merging, using a first type of linking process, a) the executable target with b) data for the library that was previously linked with the executable target using a second, different type of linking process; and
in response to receiving the request, executing the executable target.

10. The computer storage media of claim 9, wherein the executable target was built by merging the executable target with data for the library using metadata that represented a state of the library when the library was linked with the executable target using the second, different type of linking process.

11. The computer storage media of claim 10, wherein executing the executable target comprises accessing a symbol to library mapping a) that was generated using the metadata that represented the state of the library and b) that enables execution of the executable target with the same semantics as if the executable target were dynamically linked with the library.

12. The computer storage media of claim 10, wherein the metadata is generated using a data structure that represents one or more symbols, each of which is for a variable or a function call.

13. The computer storage media of claim 10, wherein the metadata is generated using a data structure that represents one or more atoms and one or more fixups for the library.

14. A system for merging an executable target with a library and comprising one or more computers and one or more storage devices on which are stored instructions that are operable, when executed by the one or more computers, to cause the one or more computers to perform operations comprising:
generating metadata for the library that represents a state of the library while linking the library with the executable target;
during a build of the executable target:
determining that the executable target was linked with the library using a first type of linking process; and
in response to determining that the executable target was linked with the library using the first type of linking process, generating, using the metadata that represents the state of the library, the executable target by merging, using a second, different type of linking process, a) the executable target with b) data for the library that was previously linked with the executable target using the first type of linking process.

15. The system of claim 14, wherein the operations comprise creating a compiled library by compiling the library, wherein linking the executable target with the library links the compiled library with the executable target.

16. The system of claim 14, wherein generating the metadata comprises generating, using a result of parsing an object file for the library, a data structure that represents one or more symbols each of which are for a variable or a function call.

17. The system of claim 14, wherein generating the metadata comprises generating, using a result of parsing an object file for the library, a data structure that represents one or more atoms and one or more fixups for the library.

18. The system of claim 14, wherein the operations comprise:
determining, for the executable target, the library on which the executable target depends; and
determining whether the library is a mergeable library,
wherein generating the executable target by merging, using the second, different type of linking process, a) the executable target with b) data for the library that was previously linked with the executable target using the first type of linking process is responsive to determining that the library is a mergeable library.

19. The system of claim 14, wherein the operations comprise:
determining a build type for the build of the executable target; and
determining, using the build type, to build the library as a mergeable library instead of as a dynamic library,
wherein generating the executable target by merging, using the second, different type of linking process, a) the executable target with b) data for the library is responsive to determining to build the library as a mergeable library instead of as a dynamic library.

20. The system of claim 19, wherein:
determining to build the library as the mergeable library comprises determining, using the build type, whether to store, in non-volatile memory, metadata that represents a state of the library; and generating the executable target by merging, using the second, different type of linking process, a) the executable target with b) data for the library uses the state of the library.

* * * * *